United States Patent
Callan

(10) Patent No.: US 9,553,788 B1
(45) Date of Patent: Jan. 24, 2017

(54) MONITORING AN INTERCONNECTION NETWORK

(71) Applicant: Amazon Technologies, Inc., Reno, NV (US)

(72) Inventor: Brian Joseph Callan, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 14/311,820

(22) Filed: Jun. 23, 2014

(51) Int. Cl.
*H04L 12/26* (2006.01)

(52) U.S. Cl.
CPC ........... *H04L 43/10* (2013.01); *H04L 43/0811* (2013.01); *H04L 43/0882* (2013.01)

(58) Field of Classification Search
CPC ... H04L 43/10; H04L 43/0811; H04L 43/0882
USPC ......................................................... 370/252
See application file for complete search history.

(56) References Cited

U.S. PATENT DOCUMENTS

| | | | | |
|---|---|---|---|---|
| 6,678,241 B1* | 1/2004 | Gai | ..................... | H04L 12/2419 370/216 |
| 6,798,775 B1* | 9/2004 | Bordonaro | .......... | H04L 12/4641 370/392 |
| 7,436,775 B2* | 10/2008 | Jordan | .................... | H04L 45/06 370/235 |
| 2003/0236888 A1* | 12/2003 | Chauffour | ............... | H04L 29/06 709/226 |
| 2005/0010685 A1* | 1/2005 | Ramnath | ............... | H04L 69/324 709/238 |
| 2009/0003210 A1* | 1/2009 | Jakobsen | ............ | H04L 43/0847 370/235 |
| 2010/0188968 A1* | 7/2010 | Wu | ...................... | H04L 12/6418 370/216 |
| 2012/0072614 A1* | 3/2012 | Marr | ................. | G06F 15/17356 709/250 |

* cited by examiner

*Primary Examiner* — Andrew Chriss
*Assistant Examiner* — Ellen Kirillova
(74) *Attorney, Agent, or Firm* — Klarquist Sparkman, LLP

(57) ABSTRACT

The following description is directed to monitoring an interconnection network. In one embodiment, a method of monitoring an internal link of an interconnection network can comprise creating a network packet. The network packet can comprise a data-link-layer destination address corresponding to a management interface of a first router of the interconnection network, and a network-layer destination address corresponding to a host computer. The network-layer destination address can be within a subnet associated with a management interface of a second different router of the interconnection network. The internal link can connect the first router and the second router. The method can further comprise transmitting the network packet from the host computer, and determining one or more performance metrics of the internal link based, at least in part, on whether the network packet is received at the host computer.

21 Claims, 7 Drawing Sheets

MONITORING AN INTERCONNECTION NETWORK

BACKGROUND

Computer networks generally comprise various interconnected computing devices that can communicate with each other to exchange data. When small numbers of devices are interconnected, the devices can be directly connected to each other. For example, one device can be directly connected to another device via a network link. However, direct connections between large numbers of devices is not scalable. Thus, the connections between a large number of devices will typically be via indirect connections. For example, one device can be connected to another device via an interconnection network comprising one or more routers. Large routers for connecting many devices together can be expensive. However, large routers can be constructed from lower cost commodity equipment interconnected with a high-radix architecture.

For example, a high-radix interconnection network can comprise multiple routers interconnected by a high-radix architecture. Exemplary high-radix architectures include Clos, folded-Clos, fat-tree, butterfly, flattened-butterfly, full-mesh, and dragonfly networks. The high-radix network can comprise a large number of "externally facing ports" for connecting to and between devices outside of the high-radix architecture. For example, each device connected to an externally facing port can connect to any other device on an externally facing port of the high-radix network. The high-radix network can comprise multiple different stages or tiers of routers. One or more tiers of routers can include externally facing ports and one or more tiers of routers can be connected only to devices internal to the high-radix architecture.

An operator of the high-radix network may desire to provide high availability and throughput through the high-radix network. Thus, the operator may monitor the high-radix network for indications of dropped or lost packets, service degradation, component failures, or congestion within the network. However, as the number of nodes and links of the high-radix network increases, it can be more difficult to detect and isolate degraded components within the high-radix network.

DETAILED DESCRIPTION

Internet Protocol (IP) network traffic can be routed using commodity IP routers that are connected by an interconnection network. For example, multiple IP routers can be connected together using a high-radix or a Clos-like network architecture. For example, 64, 96, or 128 routers can be connected together in a mesh or fabric via 10 gigabit/second (10 G) network links. Compared to a single large chassis router, the commodity routers connected with a high-radix network can potentially provide cost, resilience, bandwidth, and load-balancing benefits. However, monitoring the error-free operation of the large number of links in a highly meshed network architecture can be complicated.

In one solution, one or more possible paths across the network can be monitored by sending "pings" between agents dotted around the edge of the network. A ping operates by having a requesting host computer send an Internet Control Message Protocol (ICMP) echo request packet to a target host computer and waiting for the target to reply with an ICMP response returned to the requestor. If packet loss is detected, a triangulation process can be used to try and determine which network link or device is responsible for the packet loss. In this solution, multiple host computers are used for the monitoring and a large number of host computers may be needed to get full coverage of all of the internal links of the mesh. However, even with the use of many pings, it may not be possible to isolate and test specific network links within the network or to guarantee that all desired network links have been tested.

In the methods disclosed herein, a single monitoring agent can be used to monitor the internal links of the interconnection network. For example, the monitoring agent can connect to a management interface on each network device, e.g., router, in the interconnection network and inject health probes to test the integrity of those links internal to the interconnection network and connected to that network device. The monitoring agent does not use regular IP routing for health probe injection. Instead, the monitoring agent can "forge" layer 2 headers of outgoing frames to forcibly inject the health probes that are actually addressed back to itself. The probes take a short predetermined path through the network before returning to the monitoring agent. The monitoring agent can then make a unilateral, simple, and decisive determination of the health of the internal links and routers within the interconnection network.

Figure 1:
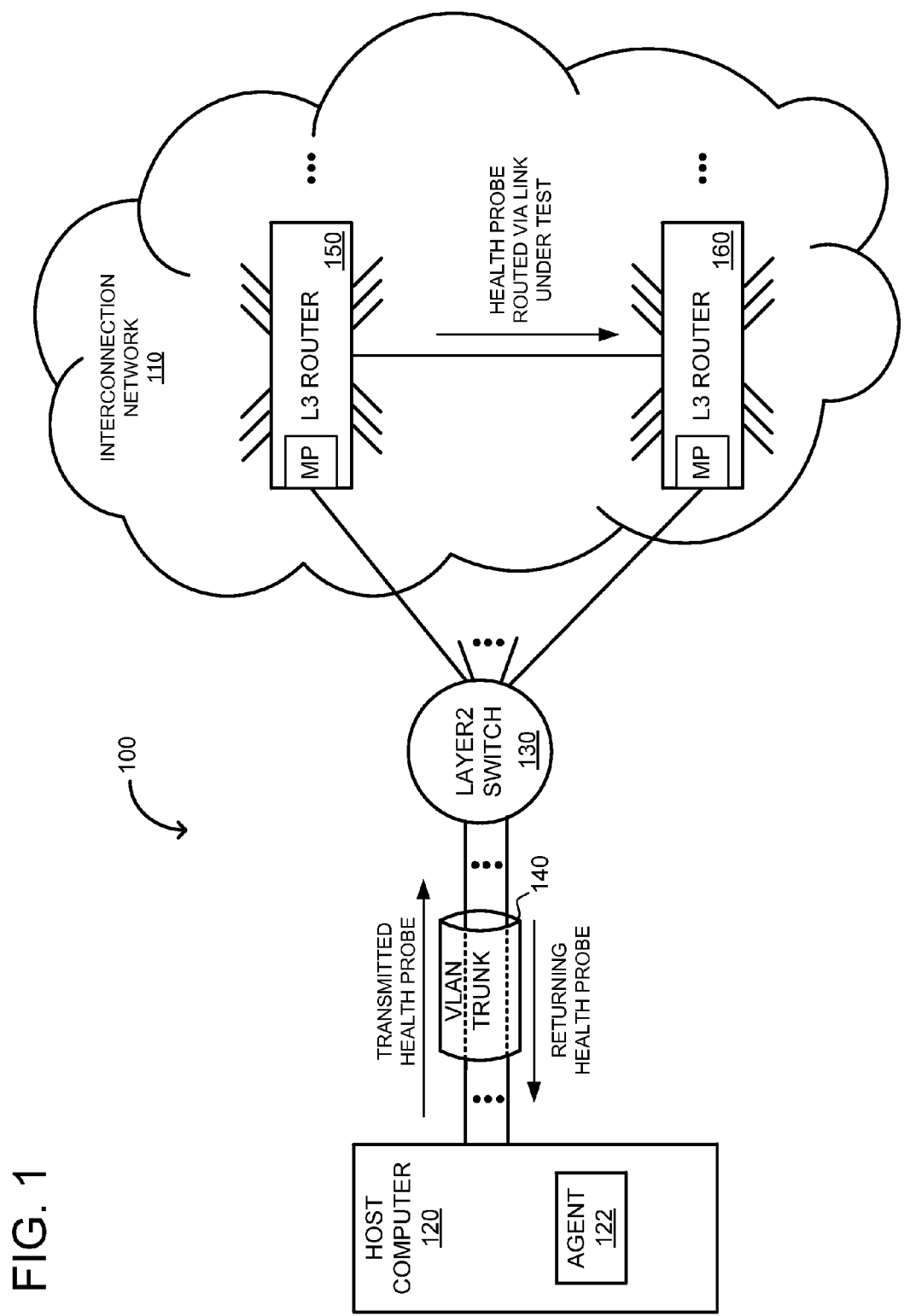
FIG. 1 is an example system diagram showing a system for monitoring an interconnection network.

Turning to the Figures, FIG. 1 is a system diagram showing an embodiment of a system 100 for monitoring an interconnection network 110. The system 100 can comprise a host computer 120 including an agent 122. For example, the agent 122 can be a software routine executing on the host computer 120, such as a daemon running as a background process. The agent 122 can create health probes to inject into the interconnection network 110 and monitor for the return of the health probes. As described in more detail below, the health probes can include data for use in diagnosing the health of the interconnection network 110. The health probe can be encapsulated in a frame or network packet for transmission to other computing devices. For example, the agent 122 can create a packet addressed to traverse a predetermined link of the interconnection network 110 and return to the host computer 120.

The health probe can be transmitted to the interconnection network 110 via a layer 2 fan-out switch 130. Generally, a switch includes multiple ports or interfaces and the switch can forward a frame from one port to a different port of the switch. As used herein, "layer 2" refers to the "data link" layer of the Open Systems Interconnection (OSI) model that partitions and standardizes the internal functions of a communication system into abstraction layers. Non-limiting examples of layer 2 protocols are Ethernet, Asynchronous Transfer Mode (ATM), Point-to-Point Protocol (PPP), High-level Data Link Control (HDLC), Fiber Distributed Data Interface (FDDI), and Token Ring. Thus, the layer 2 switch 130 can forward frames encoded in a layer 2 protocol, such as Ethernet, from one port to another port of the layer 2 switch 130. In this manner, the agent 122 can communicate with the interconnection network 110 via a layer 2 network.

The layer 2 network can include multiple virtual local area networks (VLANs) and a different VLAN can be associated with each router of the interconnection network 110. For example, the layer 2 network can include 96 VLANs if there are 96 routers in the interconnection network 110. The host computer 120 can be connected to a trunk port of the layer 2 switch 130 by a VLAN trunk 140. The VLAN trunk 140 is a network link that can carry frames from multiple VLANs. The layer 2 switch 130 can include multiple access ports, where each access port is connected to a different router of the interconnection network 110. An access port can carry frames for a single VLAN. Each endpoint of a VLAN can have a layer 3 address and a layer 2 address. Thus, the host computer 120 can have multiple different addresses corresponding to respective VLANs of the trunk link. For example, the host computer 120 can have 96 layer 3 addresses and 96 layer 2 addresses when there are 96 VLANs in the layer 2 network. Layer 2 or Media Access Control (MAC) addresses are generally unique for each hardware port. Using this configuration, the agent 122 can send a frame to a router of the interconnection network 110 by transmitting the frame over the VLAN associated with the router. Further, by using multiple VLANs, the host computer 120 can use a single network interface controller (NIC) connected by one network link to the layer 2 switch 130, but still have multiple logical interfaces for communicating with the interconnection network 110.

The interconnection network 110 can be a layer 3 network. As used herein, "layer 3" refers to the "network" layer of the OSI model. Non-limiting examples of layer 3 protocols are IP (including IPv4 and IPv6), ICMP, Address Resolution Protocol (ARP), Internetwork Packet Exchange (IPX), and Datagram Delivery Protocol (DDP). The interconnection network 110 can include multiple routers, such as routers 150 and 160, interconnected by an interconnection architecture. For example, the interconnection architecture can be a high-radix network architecture, such as described with reference to FIG. 3. For example, the interconnection network 110 can be a folded-Clos network with 64 tier-1 routers and 32 tier-2 routers, where the tier-1 routers have ports connected to customers via an external network (such as the Internet), and every tier-1 router is connected to every tier-2 router. Connections between routers can be by a single network link or by multiple network links. Generally, a router includes multiple interfaces or ports and the router can forward a packet from one port to a different port. The forwarding decision can be based on a layer 3 destination address, for example. Layer 3 addresses are generally based on the topology of the network. Routers 150 and 160 can each include a management port (MP) for connecting to the layer 2 network. For example, each management port can connect to a different access port of the layer 2 switch 130.

It should be understood that the terms "switch" and "router" can be used interchangeably for network devices having multiple ports. For purposes of clarity and explanation, this document standardizes on the term "switch" to mean a multi-port network bridge that processes and forwards data at the data link layer (layer 2) of the OSI model, and the term "router" to mean a multi-port network device that processes and forwards data at the network layer (layer 3) of the OSI model. It should also be understood that a layer 2 fan-out switch can be a single device or multiple interconnected devices.

As the following example demonstrates, the system 100 can be used to monitor one or more network links of the interconnection network 110. A link under test is determined by creating a health probe, e.g., a network packet, with a layer 2 destination address of a router on the transmitting end of the link under test, and a layer 3 destination address within a subnet of a router on the receiving end of the link under test. Multiple links can be tested, by creating multiple packets with addresses selected to route the packet across the respective links. The health probe is both sent from and received at the host computer 120, taking a round-trip path from the host computer 120, through a predetermined link, and back to the host computer 120. Thus, the link under test should be connected to routers that have a direct or indirect path to the host computer 120. When all of the routers of the interconnection network 110 are connected to the host computer 120, then all of the internal links between the routers can be tested by the agent 122.

For example, the links connecting the routers of the interconnection network 110 can be tested by the agent 122. The agent 122 can create a health probe for testing a link of the interconnection network 110. The health probe can be a unilateral, unidirectional probe that is directed towards the agent 122. In other words, the health probe can be sourced by and returned to the agent 122. Thus, a single agent 122 can both generate the probe and monitor for the probe's return. The host computer's 120 regular networking stack would typically prevent the health probe from being transmitted from the host computer 120 because the destination address resides on the originating host, e.g., the host computer 120. However, the agent 122 can "forge" a layer 2 destination address to forcibly inject the health probe into the layer 2 network without using the host's regular networking stack. For example, the health probe transmitted by the host computer 120 can include a layer 2 destination address that corresponds to the management port of a router that is connected to the link under test. The health probe can include a layer 3 destination address corresponding to the host computer 120 so that when the interconnection network 110 is operating as expected, the network will return the packet to the originating host computer 120 after a short number of network hops (typically three).

The health probe can be transmitted on a VLAN corresponding to the management port of the router that is connected to the link under test. The host computer 120 can include a layer 3 IP address corresponding to each VLAN connected to the host computer 120. For example, the host computer 120 can have an IP address 10.1.1.0 associated with VLAN 1 and an IP address 10.2.2.0 associated with VLAN 2; the management port of router 150 can have an IP address 10.1.1.1 associated with VLAN 1; and the management port of router 160 can have an IP address 10.2.2.1 associated with VLAN 2. The health probe can be forcibly sent out by the agent 122 on VLAN 1, with a layer 2 destination MAC address of the management interface of router 150. Thus, the transmitted health probe can include a source IP address of 10.1.1.0 and a destination IP address of 10.2.2.0. The transmitted health probe can be transmitted from the host computer 120 to the layer 2 switch 130 via the VLAN trunk 140, and the layer 2 switch 130 can forward the health probe to the management port of router 150 based on the layer 2 destination MAC address of the health probe.

When the health probe arrives at the router 150, "normal" routing can be used to forward the probe towards the router 160 across the link under test. In other words, the routing information in the health probe causes the health probe to traverse a predetermined path through the interconnection network 110 when the link under test is functioning properly. The router 150 can examine the destination IP address of the health probe and determine that the next hop in the route is through the router 160. As a specific example, the router 150 can determine that the destination IP address of 10.2.2.0 is on the same subnet as the management port of the router 160 and the health probe can be forwarded across the link under test to the router 160.

As part of the normal routing, the health probe can be modified as it passes through components of the system 100. For example, a time-to-live (TTL) field in a layer 3 header of the health probe can be decremented as the health probe passes through each layer 3 component, such as routers 150 and 160 and host computer 120. As another example, a layer 2 header can be stripped from the received frame and regenerated for transmission at each layer 3 component.

When the health probe arrives at the router 160, normal routing can be used to forward the probe out of the management port of the router 160 over VLAN 2 to the originating host computer 120. Specifically, the router 160 can examine the destination IP address of the health probe and determine that the destination IP address of 10.2.2.0 is on the same subnet as the management port of the router 160. The health probe can be forwarded through the layer 2 switch 130 to the originating host computer 120.

The agent 122 can monitor for the receipt or non-receipt of the health probe at the host computer 120 and determine one or more performance metrics of the link under test based, at least in part, on whether the network packet is received at the host computer. For example, the agent 122 can determine that the link under test is down when the health probe is not received at the host computer 120 within a predetermined time interval after the health probe is transmitted. The predetermined time interval can be set based on the expected number of hops through the network and a desired latency through each component of the network. As another example, the agent 122 can determine that the link under test is down when the received health probe comprises a TTL field having a value less than a predetermined value. For example, the health probe will typically traverse a router on the transmitting end of the link under test, a router on the receiving end of the link under test, and the host computer 120. Thus, the TTL field will typically be decremented by three. However, the health probe may take an alternate, longer path through the interconnection network 110 due to a problem with a network link or component of the interconnection network 110. In this case, the TTL field will be decremented by more than expected, so a TTL field that is less than expected can indicate a problem with the interconnection network 110.

The agent 122 can correlate data from multiple health probes to determine one or more performance metrics of the link under test. For example, the latency or delay of a health probe through the system 100 can be measured by the agent 122. The latency of a health probe can be measured by taking a difference of the time when the health probe is received at the agent 122 and a time when the health probe is transmitted from the agent 122. The latency can be stored and compared to latencies of other health probes sent across the same link under test. A jitter or packet delay variation can be calculated based on the latencies of multiple health probes. For example, jitter can be calculated as a deviation from the mean or average latency over a single link. As another example, jitter can be calculated as a deviation from the mean or average latency over multiple links. The agent 122 can determine that the internal link is congested when the jitter exceeds a predetermined threshold. As another example, a count or percentage of lost health probes over a period of time through the link under test can be indicative of a link that is partially functional. For example, if one out of 200 health probes are dropped or corrupted by a link then the link may be partially functional and in need of maintenance. A partially functional link may indicate that a connector of the link is not seated properly or a laser associated with the link is attenuating over time, etc.

The agent 122 can correlate data from multiple health probes to determine one or more performance metrics of components associated with the link under test. For example, the performance metrics of multiple links associated with a router can be analyzed to determine a performance metric of the router. For example, if all of the links of a particular router are down or experiencing a high latency, then the particular router can be the source of the problem. Similarly, if only forty percent of the health probes traversing the router are returned, the router can be the source of the problem. Problems of this nature may be indicative of the router having a faulty or "hung" central processor unit, corrupt memory, or a faulty or hung application-specific integrated circuit (ASIC). Thus, it may be desirable to reboot the router or to take the router off-line for maintenance.

Figure 2:
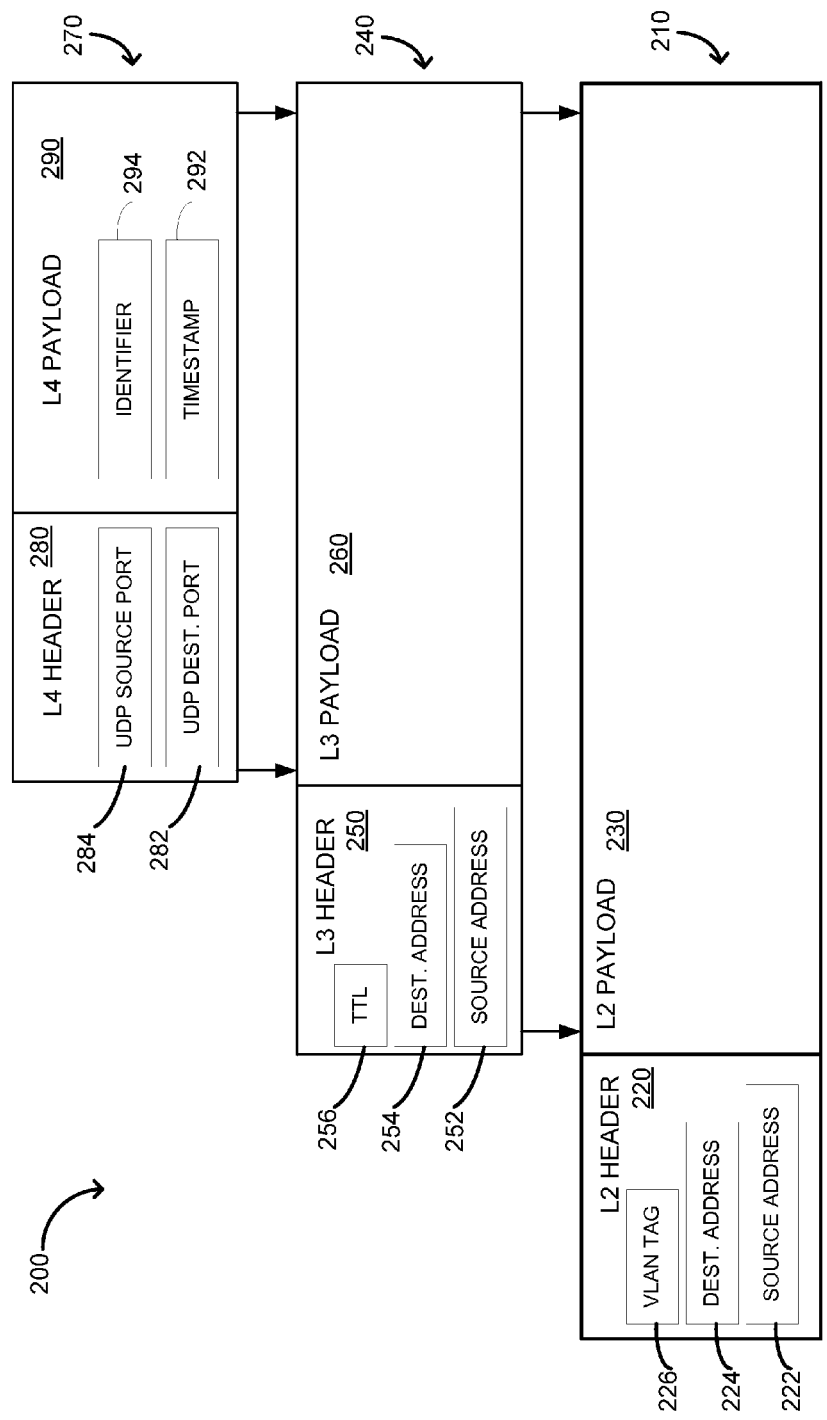
FIG. 2 shows an example of a network packet used in a system for monitoring an interconnection network.

FIG. 2 shows an example of a health probe 200 used in a system for monitoring an interconnection network, such as the interconnection network 110. The health probe 200 can comprise a network packet including information corresponding to multiple layers of the OSI model. For example, the health probe 200 can comprise a layer 2 frame 210 including a layer 2 header 220 and a layer 2 payload 230. Generally, a header is a data structure that is used by peers to communicate with each other. The format of the header is determined based on the specific networking protocol associated with the header. Thus, an Ethernet header can be different from a HDLC header, for example. However, there can be common fields between different layer 2 protocols. For example, the layer 2 header 220 can comprise a source address 222 and a destination address 224. The source address 222 can be a layer 2 address (such as a MAC address) corresponding to a node in the layer 2 network that originated the frame. The destination address 224 can be a layer 2 address corresponding to a receiving node in the layer 2 network. Thus, the source address 222 of the transmitted health probe 200 can correspond to an address of the host computer 120, and the destination address 224 can correspond to the router of the interconnection network 110 that is connected to the transmitting end of the link under test. The source address 222 of the returning health probe 200 can correspond to the router of the interconnection network 110 that is connected to the receiving end of the link under test, and the destination address 224 can correspond to an address of the host computer 120. The layer 2 header 220 can comprise a VLAN tag 226 for identifying the VLAN associated with the frame. As described above with reference to FIG. 1, the health probe 200 can be sent over a first VLAN and returned over a second VLAN.

The layer 2 frame 210 can encapsulate health probe data and higher level routing information. For example, the layer 2 frame 210 can encapsulate a layer 3 packet 240. Specifically, the layer 2 payload 230 can include the layer 3 packet 240. The layer 3 packet 240 can include a layer 3 header 250 and a layer 3 payload 260. The layer 3 header 250 can include a source address 252, a destination address 254, and a TTL field 256. The source address 252 can be a layer 3 address (such as an IP address) corresponding to a node that originated the packet. The destination address 254 can be a layer 3 address corresponding to a receiving node of the packet. Since the source and destination of the health probe 200 can be the host computer 120, the source address 252 of the transmitted health probe 200 can correspond to a first address of the host computer 120, and the destination address 254 can correspond to a second address of the host computer 120. For example, the source address 252 can correspond to an IP address associated with a first VLAN and the destination address 254 can correspond to an IP address associated with a second VLAN.

Generally, the TTL field 256 can be used to prevent a packet from persisting in the network for an undesirable amount of time, such as if the packet is looping in the network. The TTL field 256 can be written with an initial value greater than zero, and each layer 3 node can decrement the TTL field 256 by one as the packet passes through the node. When the TTL field 256 is decremented to zero, the packet can be discarded. The TTL field 256 of the transmitted health probe 200 can be programmed with an initial value greater than the expected hop count through the interconnection network. The TTL field 256 of the returning health probe 200 can be analyzed, as described above, to determine if the link under test is fully or intermittently down.

The layer 3 frame 240 can encapsulate health probe data and higher level routing information. For example, the layer 3 frame 240 can encapsulate a layer 4 packet 270. Specifically, the layer 3 payload 260 can include the layer 4 packet 270. The layer 4 packet 270 can include a layer 4 header 280 and a layer 4 payload 290. The layer 4 header 280 can include a User Datagram Protocol (UDP) destination port 282 and a UDP source port 284. The UDP destination port 282 and the UDP source port 284 can be configured to provide "entropy" across a link aggregation group (LAG). For example, providing entropy can include randomizing or programmatically setting the UDP destination port 282 and a UDP source port 284 such that multiple health probes hash to and traverse all the members (e.g., links) of the LAG. A LAG can include multiple network links connected between the same two routers. By bundling, or aggregating the links from one router to a second router, the bandwidth between the routers can potentially be increased proportionally to the number of links bundled. For example, bundling four 10 G links between routers can potentially increase the bandwidth from 10 gigabit/second to 40 gigabit/second. The router will typically be configured to create a fair distribution of traffic between the links based on the source address 252, the destination address 254, and the layer 4 header 280. For example, the router can use a round-robin or hashing algorithm based on the source address 252, the destination address 254, and the layer 4 header 280 to determine which one of the aggregated links will transmit the packet. In one embodiment, the transmitted health probe 200 can include a randomized UDP destination port 282 and UDP source port 284 to potentially create an equitable distribution across aggregated links. In an alternate embodiment, the transmitted health probe 200 can target a specific link of the LAG by configuring the UDP destination port 282 and the UDP source port 284 based on the hash function of the router.

The layer 4 payload 290 can include a timestamp 292 and an identifier 294. The identifier 294 can be used to uniquely identify the health probe 200 over a pre-determined period of time or number of packets. For example, the identifier 294 can be used to uniquely identify the health probe 200 over fifteen seconds. The identifier 294 can include a field for identifying the host computer 120 and the agent 122 that originated the health probe 200. Thus, if other hosts or agents are creating health probes, the identifier 294 can guard against accidental cross-talk between health probes generated on other hosts and/or agents.

The timestamp 292 can correspond to the time when the health probe 200 is injected into the system 100. The latency of the health probe 200 can be determined by taking a difference between the timestamp of when the health probe 200 arrives at the host computer 120 and the timestamp 292. In an alternative embodiment, the time when the health probe 200 is injected into the system 100 can be recorded in a table indexed by the identifier 294.

While the layer 4 packet 270 depicted in the example health probe 200 is a UDP packet, other layer 4 network protocol packet types can be used. For example, a TCP packet can be used as the layer 4 packet 270 (e.g., including TCP source and destination ports which can be used for LAG testing). As another example, a custom layer 4 packet can be used as the layer 4 packet 270. When a custom layer 4 packet is used, the routers of the interconnection network may be custom programmed to allow for LAG testing.

Figure 3:
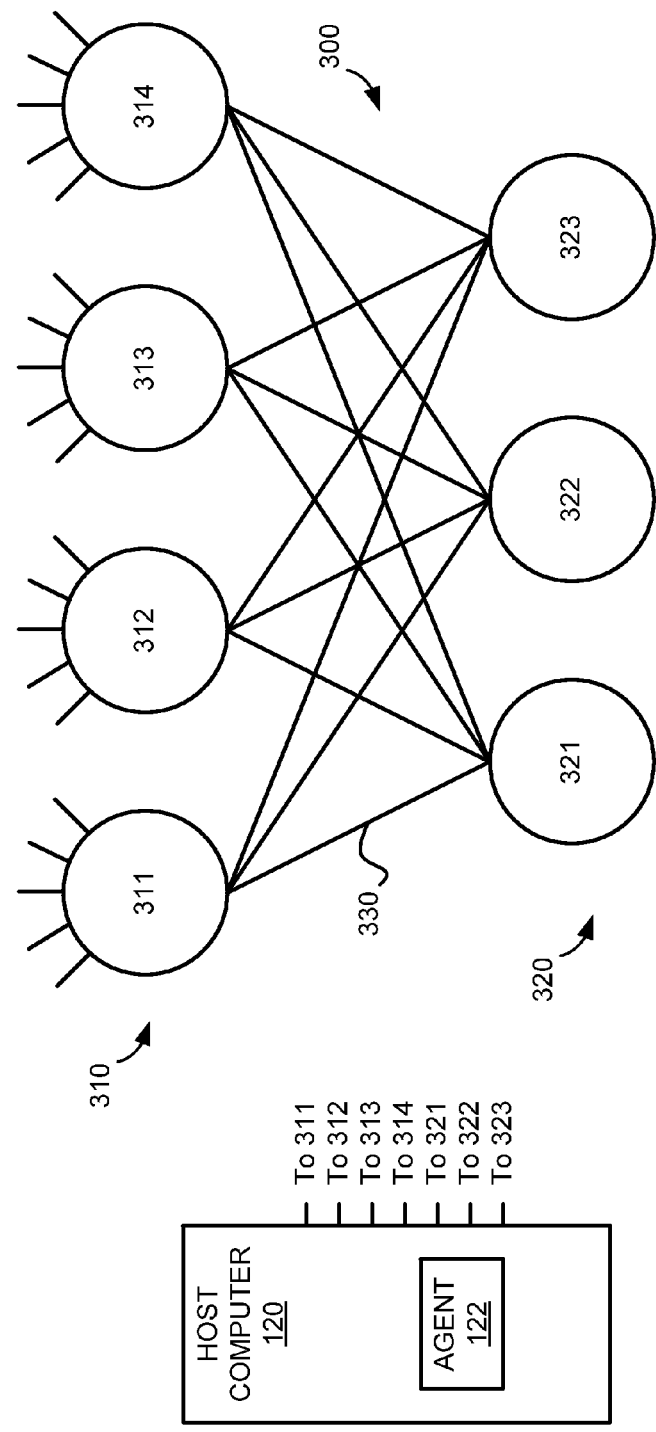
FIG. 3 is an example system diagram of an embodiment of an interconnection network.

FIG. 3 illustrates an embodiment of a two-tier folded Clos interconnection network 300. Generally, the interconnection network 300 can be a high-radix interconnection network, such as a Clos, folded-Clos, fat-tree, butterfly, flattened-butterfly, full-mesh, or dragonfly network, for example. The interconnection network 300 can include multiple tiers of routers, such as a first tier 310 and a second tier 320 of routers. The first tier 310 can include routers 311-314 and the second tier 320 can include routers 321-323, for example. Alternative embodiments can include two or more tiers and/or can include more or fewer routers in each tier. As one example, a two-tier folded Clos network can include 64 routers in the first tier and 32 routers in the second tier. One or more routers of the first tier 310 can include externally facing ports for communicating with devices outside of the interconnection network 300. Each of the routers of the first tier 310 can be connected to one or more routers of the second tier 320. For example, respective routers 311-314 of the first tier 310 are connected to each router 321-323 of the second tier 320 via internal links, where an internal link is a network link that connects devices only within the interconnection network 300. Routers within a tier may not be connected to each other. For example, none of the routers 311-314 of the first tier 310 connect to each other and none of the routers 321-323 of the second tier 320 connect to each other. Each of the routers of the second tier 320 can be connected to one or more routers of the interconnection network 300 via internal links.

The host computer 120 can be connected to one or more routers of the interconnection network 300. In one embodiment, the host computer 120 can be connected to one or more routers of the interconnection network 300 via one or more fan-out switches configured to carry network traffic of multiple VLANs, such as described with reference to FIG. 1. Thus, the host computer 120 can be connected by one physical network link and multiple logical interfaces to the routers of the interconnection network 300. In an alternative embodiment, the host computer 120 can be connected to one or more routers of the interconnection network 300 via a separate NIC for each router. It may be desirable to use a fan-out switch so that fewer NICs can be used to connect the host computer 120 to the routers of the interconnection network 300. Connecting the host computer 120 to the routers of the interconnection network 300 can enable internal links of the interconnection network 300 to be monitored even when customer traffic is routed away from the internal links. For example, a router can be configured so that traffic from an externally facing port (e.g., customer traffic) of the interconnection network 300 does not traverse any internal links connected to the router, such as when the router is believed to be unhealthy or degraded. For example, an internal link can be considered degraded when packet loss is detected (e.g., when a percentage of health probes sent along the internal link do not arrive). If a router is believed to be unhealthy, the routing attributes (e.g., the OSPF metrics) associated with the router can be weighted to push customer traffic away from the unhealthy router. However, by addressing the health probe to a connected interface on the unhealthy router, the health probe can still be routed to the unhealthy router. The unhealthy router can be replaced with a different router and the internal links of the new router can be monitored with the health probes prior to restoring customer traffic to the router (by returning the routing attributes to normal). In comparison, a health monitoring service with agents connected to the externally facing ports would have its health probes routed away from the unhealthy router along with the customer traffic.

The agent 122 can discover the nodes of the interconnection network 300. It can be desirable for the interconnection network 300 to have a regular architecture with a well-known structure in order to reduce the amount of discovery of the interconnection network 300. By using a regular architecture, the agent 122 is not required to perform repeated network discovery with "traceroute" or polling of an Interior Gateway Protocol (IGP) database. Rather, the agent 122 can be configured with information detailing which routers are in which tier (e.g., tier1, tier2, . . . tier n) and which variant of high-radix architecture is used (such as Clos, folded-Clos, fat-tree, butterfly, flattened butterfly, full-mesh, or dragonfly) for the interconnection network 300. Alternatively, the agent 122 can be programmed with the structure of the interconnection network 300 (e.g., such that discovery is not needed).

The number of routers at each tier can be discovered by using a regular address structure for the addresses of the management ports of the routers. Thus, the same address structure can be re-used for each similar interconnection network that is being managed. For example, the devices of the first tier 310 can be addressed using /31 subnets out of a reserved /22 address space and the devices of the first tier 310 can be reachable from the NIC of the host computer 120 on VLANs 1 through 512. It should be understood that a "/31" subnet is Classless Inter-Domain Routing (CIDR) notation referring to an IP address with a routing prefix of 31 address bits, leaving one address bit available to identify two different hosts (such as the host computer 120 and a management port of a device of the first tier 310). The devices of the second tier 320 can be addressed using /31 subnets out of a reserved /23 address space and the devices of the second tier 320 can be reachable from the NIC of the host computer 120 on VLANs 513 through to 768. Devices of a third tier (not shown) can be addressed using /31 subnets out of a reserved /24 address space and the devices of the third tier can be reachable from the NIC of the host computer 120 on VLANs 769 through to 896. The host computer 120 can be pre-configured with all 896 VLANs and /31 subnets. The agent 122 can ping the remote end of each /31 subnet to learn how many devices are in the first tier 310, second tier 320, and third tier of the architecture. The agent 122 can learn the MAC address of the remote ends of the /31s to enable the health probe injection.

Based on the architecture type and the number of devices at each tier, the agent 122 can determine which devices of the first tier 310 are connected to which devices of the second tier 320, and which devices of the second tier 320 are connected to which devices of the third tier, and so on, without any further network discovery. Based on the connectivity of the devices of the interconnection network 300, the agent 122 can determine all of the internal links of the interconnection network 300 and health probes can be sent across all of the internal links to test the interconnection network 300. Alternatively, an explicit list of all of the internal links to test can be maintained, and health probes can be sent only to the internal links on the list. Thus, when a problematic link is found, the link can be removed from the list to prevent the agent 122 from sending redundant alarms about the problematic link. In some embodiments, an explicit list of the internal links to test is maintained. For example, the list can indicate some or all of the internal links that are present in the interconnection network (e.g., only some of all the possible internal links may be cabled) and/or some or all of the internal links that are currently configured in the interconnection network (e.g., some links may be taken out of service).

In an alternative embodiment, the interconnection network 300 can be monitored by two or more host computers to potentially improve the resiliency of the monitoring. When a second host computer is used for the monitoring, the VLAN numbering can be the same as for the host computer 120, but the IP addressing for the second host computer can come out of another set of reserved /22, /23, /24 address spaces and the network devices can be configured to include secondary addresses on the management interfaces of the network devices. Alternatively, the /31 subnets (2 addresses) can be increased to /29 subnets and each of the host monitors can be assigned to different addresses within the /29 subnet; the reserved /22, /23, /24 address spaces above can also be increased to /20, /21, /22 address spaces to accommodate the larger /29 subnet. When multiple monitoring hosts are present, a quorum system can be implemented, where the monitoring hosts responsible for the interconnection network 300 vote on whether a link is problematic prior to calling in an issue to a central monitoring agent.

Figure 4:
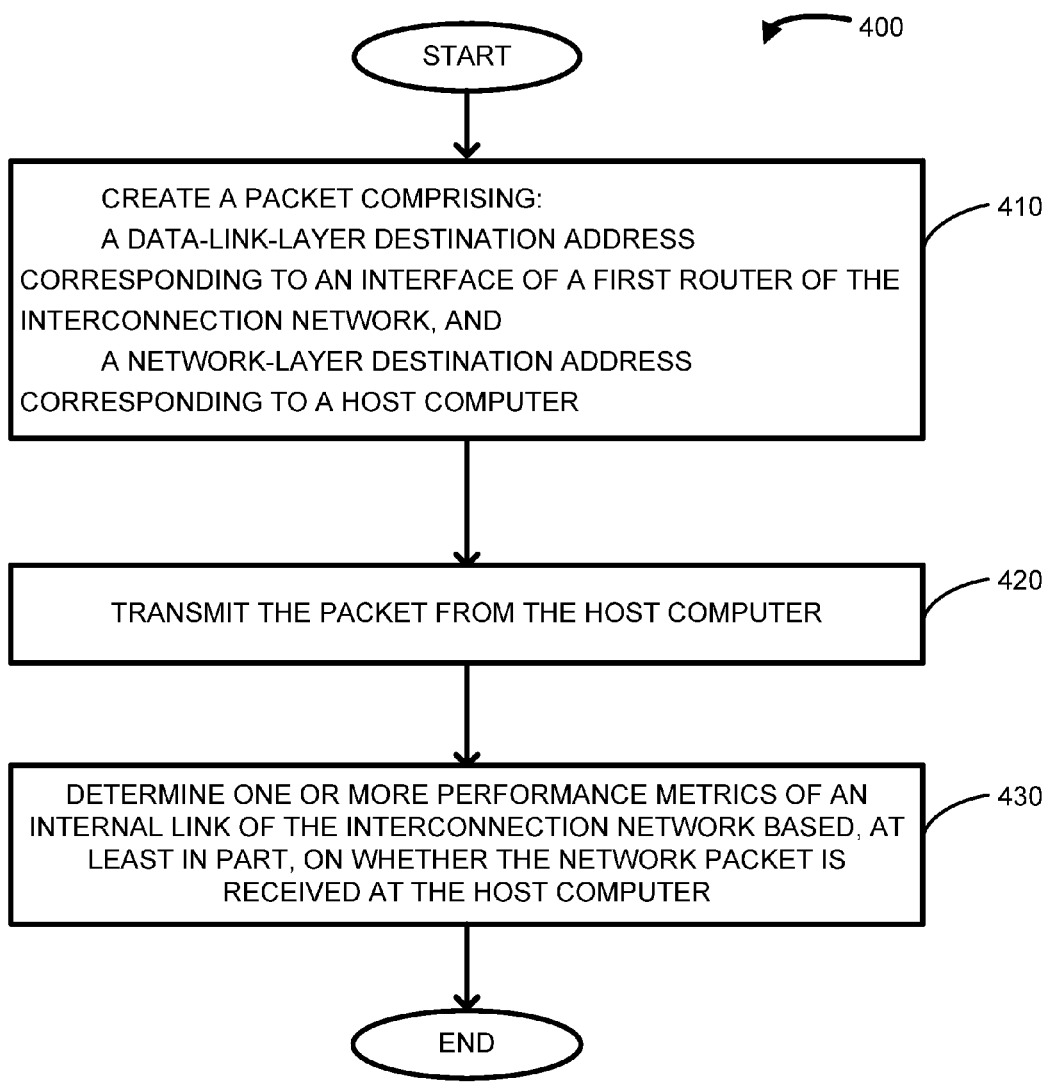
FIGS. 4-5 show flow diagrams of example methods for monitoring an interconnection network.

FIG. 4 shows a flow diagram of an example method 400 for monitoring an interconnection network, such as the interconnection network 300 of FIG. 3. At 410, a health probe packet can be created. Generally, the packet can be addressed to traverse a predetermined link of the interconnection network and return to the host computer that sends the packet. As an example, the predetermined link can be network link 330 of the interconnection network 300. The packet can comprise a data-link-layer destination address corresponding to an interface of a first router of the interconnection network, and a network-layer destination address corresponding to a host computer. The first router can be the router connected to the transmitting end of the predetermined link. For example, the data-link-layer destination address corresponding to the interface of the first router can be the MAC address of a management interface of router 311. The network-layer destination address corresponding to the host computer can be an IP address corresponding to an interface of the host computer 120 that is within the subnet associated with the management interface of a second router. The second router can be the router on the receiving end of the predetermined link. For example, the network-layer destination address corresponding to the host computer can be an IP address assigned to the host computer that is on the same subnet as a management interface of router 321. The health probe packet can include other information such as a time-stamp, a unique identifier, a TTL field, a network layer source address, a VLAN tag, and/or an UDP source and destination ports, for example.

At 420, the packet can be transmitted from the host computer. For example, the packet can be transmitted from the host computer 120 over a first VLAN to the management interface of router 311. A timer can be started or a time value can be stored in association with an identifier for the packet when the packet is transmitted. When the interconnection network 300 is working properly, the router 311 can transmit the packet to the next hop in the network path of the packet based on the network-layer destination address of the health probe packet. Thus, router 311 can transmit the packet across the predetermined link, e.g., link 330, to the router 321. However, the packet can get dropped or corrupted if the interconnection network 300 is not working properly, such as if there is a problem with routers 311 or 321 or link 330. The packet can get delayed if there is congestion on routers 311 or 321 or link 330. The packet can be transmitted from the management interface of router 321 over a second VLAN to the host computer 120, where the network-layer destination address is associated with the second VLAN.

At 430, one or more performance metrics of the internal link can be determined based, at least in part, on whether the packet is received at the host computer. It can be determined that the internal link is down if the packet is not received within a predetermined time interval. If a packet is received, the contents of the received packet can be analyzed to verify that the packet was sent by the host computer 120 and that the packet is not corrupt. For example, the identifier and the network layer source address of the packet can be examined to determine that the host computer 120 sent the packet. The TTL field can be compared to a predetermined value of the TTL field. It can be determined that the internal link is down if the TTL is less than the predetermined value. A latency of the packet can be determined by taking the difference between the timestamps when the packet was received and when the packet was transmitted. The latency of the packet can be compared to the latency of other packets using statistical techniques. Using statistical techniques, the internal link can be monitored over time and/or devices associated with multiple links can be monitored. For example, a jitter of the internal link can be determined, and it can be determined that the link is congested based, at least in part, on the jitter exceeding a predetermined threshold. The jitter can be determined by comparing the latency of the packet to a mean or average of the latencies of other packets transmitted either over the same internal link or over multiple links. The performance metrics of the internal link can be correlated to performance metrics of a different internal link to determine performance metrics of a router of the interconnection network. For example, if multiple internal links connected to a network device appear problematic, then the source of the problem can be the network device.

Figure 5:
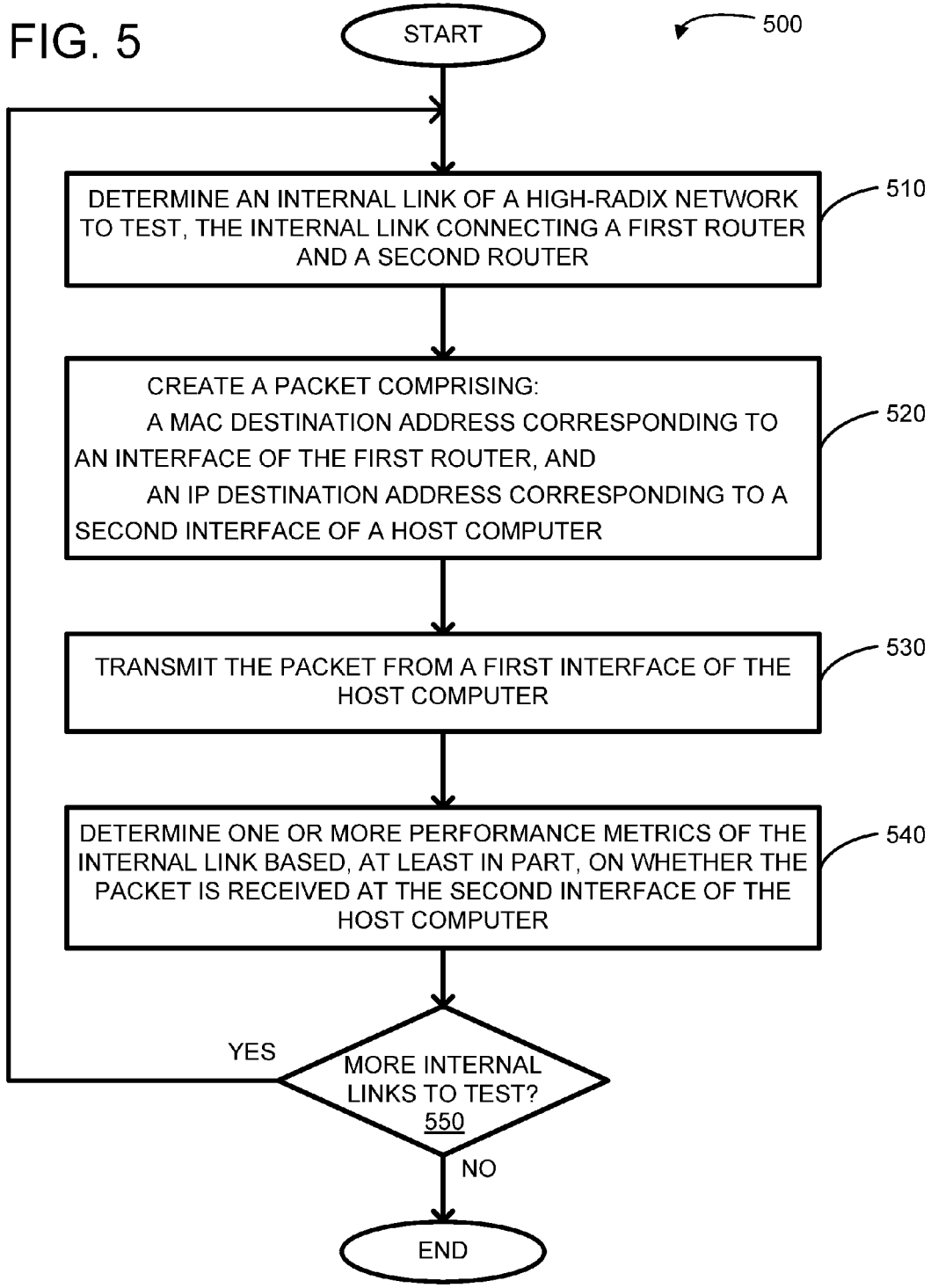

FIG. 5 shows a flow diagram of an example method 500 for monitoring an interconnection network. At 510, an internal link of a high-radix network can be selected to test. The internal link can connect a first router and a second router. For example, the internal link can be the link 330, connecting router 311 and 321.

At 520, a health probe packet can be created. The packet can comprise a MAC destination address corresponding to an interface of the first router, and an IP destination address corresponding to a second interface of a host computer. For example, the MAC destination address can be the MAC address corresponding to the management interface of the router 311, and the IP destination address can be the IP address corresponding to an interface of the host computer 120, such as the interface connected to the subnet associated with the management port of the router 321.

At 530, the packet can be transmitted from a first interface of the host computer. For example, the packet can be transmitted from an interface connected to the subnet associated with the management port of the router 311.

At 540, one or more performance metrics of the internal link can be determined based, at least in part, on whether the packet is received at the second interface of the host computer. For example, one or more performance metrics of the internal link 330 can be determined based, at least in part, on whether the packet is received at the second interface of the host computer 120.

At 550, it can be determined if there are more internal links to test, and if there are more internal links to test, the method 500 can continue at 510. For example, the host computer 120 can be connected to every router of the high-radix interconnection network and the host computer 120 can be configured to test each individual internal link of the high-radix network. In other words, the agent 122 can test all internal links by looping over all possible links connecting the routers of the high-radix network. As another example, all of the internal links associated with a network device of the high-radix network can be tested to determine if the network device is behaving properly. As yet another example, a single internal link can be tested multiple times in succession to determine if the internal link has an intermittent or "gray" failure manifested by occasional packet loss or corruption.

Figure 6:
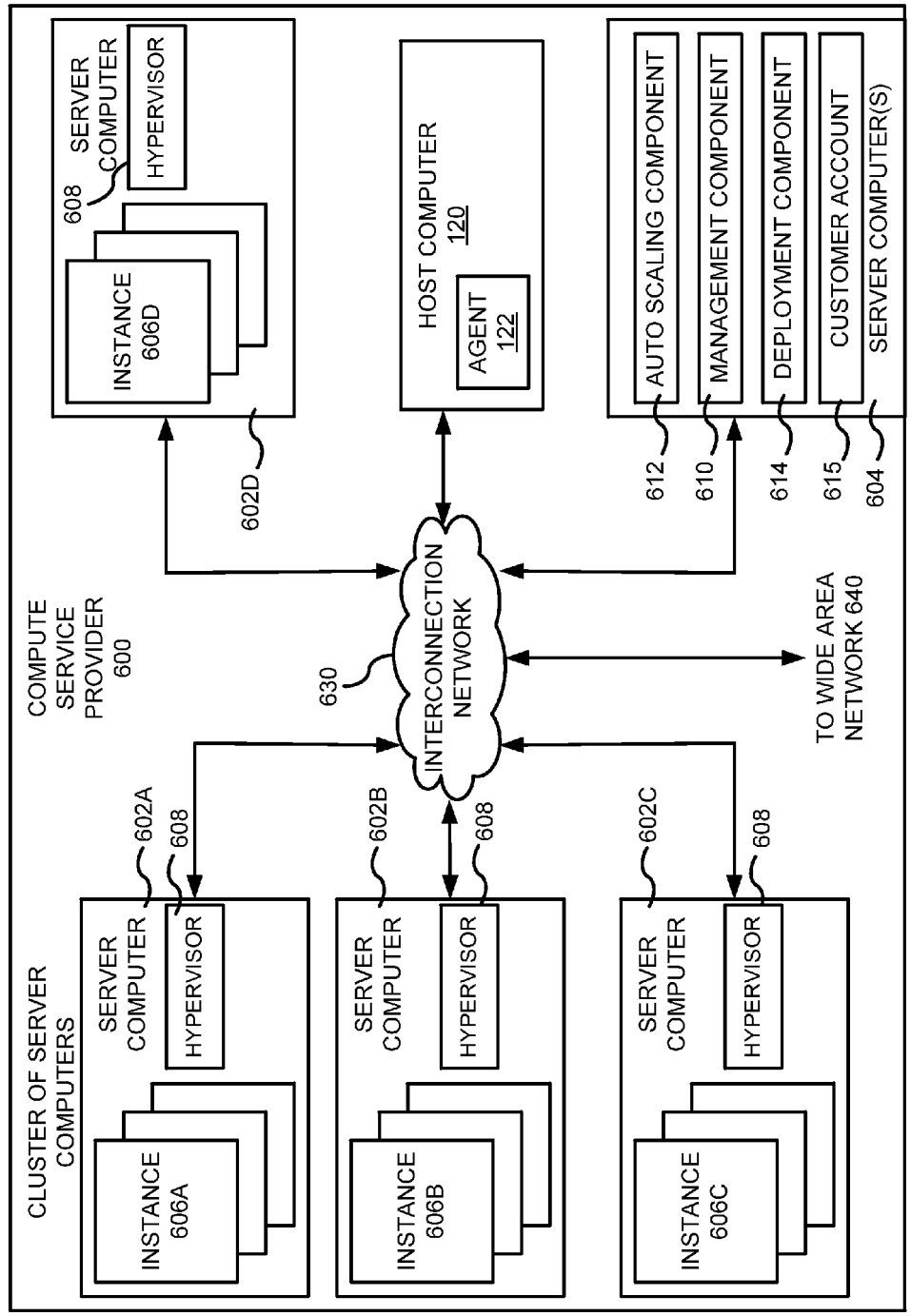
FIG. 6 is an example system diagram showing a plurality of virtual machine instances running in the multi-tenant environment

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider 600 can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer(s) 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

An interconnection network 630, as disclosed herein, can be utilized to interconnect the server computers 602A-602D and the server computer(s) 604. The interconnection network 630 can be a high-radix interconnection network, such as a Clos, folded-Clos, fat-tree, butterfly, flattened-butterfly, full-mesh, or dragonfly network, for example. The server computers 602A-602D and the server computer(s) 604 can be connected to externally facing ports of the interconnection network 630. A Wide Area Network (WAN) 640 can be connected to externally facing ports of the interconnection network 630 so that end users can access the compute service provider 600. It should be appreciated that the network topology illustrated in FIG. 6 has been simplified and that many more networks and networking devices can be utilized to interconnect the various computing systems of the service provider 600.

The host computer 120 can be connected to the interconnection network 630 via a dedicated layer 2 network. For example, a dedicated layer 2 switch (or combination of switches) (not shown in FIG. 6) can be used to connect the host computer 120 to a management interface of each router of the interconnection network 630. The layer 2 switch can include a VLAN trunk for connecting to a NIC of the host computer 120 and multiple access ports, each access port associated with only one VLAN for connecting to a single router of the interconnection network 630. Each VLAN can be associated with a private IP subnet that is not accessible from outside of the interconnection network 630. Thus, the health probe traffic can stay interior to the interconnection network 630. By using a dedicated layer 2 network for the health probes, the same address space can potentially be used for other interconnection networks of the compute service provider 600, which can potentially simplify the configuration of the agent 122.

The host computer 120 can include a second NIC (not shown) for connecting to the server computer(s) 604 and/or the server computers 602A-602D. The interface associated with the second NIC can be used to communicate with the host computer 120 to manage the host computer 120 and to retrieve health data about the interconnection network 630. For example, the agent 122 can operate as a web service that is accessible to the server computer(s) 604 and/or the server computers 602A-602D. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 7:
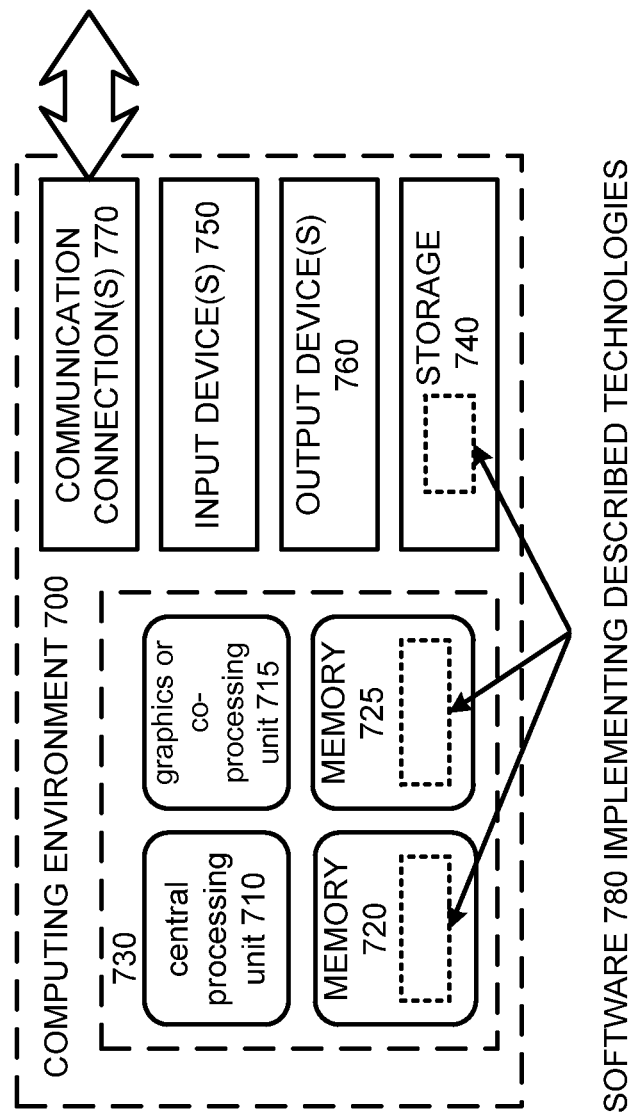
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of monitoring an internal link of a high-radix network, the high-radix network comprising a first router and a second different router connected by the internal link, the method comprising:
    creating, by a host computer comprising a first interface and a second interface, a network packet comprising:
        an Internet Protocol (IP) destination address addressed to the host computer and corresponding to the second interface of the host computer, the IP destination address being within a subnet associated with a management interface of the second router of the high-radix network, and
        a media access control (MAC) destination address addressed to a management interface of the first router of the high-radix network;
    transmitting the network packet from the first interface of the host computer; and
    determining one or more performance metrics of the internal link based, at least in part, on whether the network packet is returned to the host computer via the second interface.

2. The method of claim 1, wherein transmitting the network packet from the first interface of the host computer comprises transmitting the network packet via a first virtual local area network (VLAN) associated with the first router, and wherein the IP destination address is associated with a second VLAN, wherein the second VLAN connects the second router with the host computer.

3. The method of claim 1, wherein determining the one or more performance metrics of the internal link includes determining the internal link is down when the network packet is not returned to the host computer within a predetermined time interval after the network packet is transmitted.

4. The method of claim 1, wherein the high-radix network comprises a plurality of routers, the first router is in a first tier of the plurality of routers, and the second router is in a different, second tier of the plurality of routers.

5. The method of claim 1, wherein the transmitted network packet comprises a time-to-live field, and determining the one or more performance metrics of the internal link comprises determining the internal link is down when the received returned network packet comprises the time-to-live field having a value less than a predetermined value.

6. The method of claim 1, wherein determining the one or more performance metrics of the internal link includes determining a jitter based, at least in part, on a latency of the network packet, and determining that the internal link is congested when the jitter exceeds a predetermined threshold.

7. The method of claim 1, further comprising correlating the performance metrics of the internal link to performance metrics of a different internal link to determine performance metrics of a router of the high-radix network, wherein the internal link and the different internal link are associated with the router.

8. A non-transitory computer-readable storage medium including instructions thereon for executing a method of monitoring an internal link of an interconnection network, the interconnection network comprising a first router and a second router, the first router connected to the second router by the internal link, the method comprising:
    creating a network packet comprising:
        a network-layer destination address addressed to a host computer, the network-layer destination address within a subnet associated with a management interface of the second router of the interconnection network, and
        a data-link-layer destination address addressed to a management interface of the first router of the interconnection network;
    transmitting the network packet from the host computer; and
    determining one or more performance metrics of the internal link based, at least in part, on whether the network packet is received at the host computer.

9. The computer-readable storage medium of claim 8, wherein the data-link-layer is Ethernet and the network-layer is Internet Protocol (IP).

10. The computer-readable storage medium of claim 8, wherein transmitting the network packet from the host computer comprises transmitting the network packet via a first virtual local area network (VLAN) associated with the first router, and wherein the network-layer destination address is associated with a second VLAN, wherein the second VLAN connects the second router with the host computer.

11. The computer-readable storage medium of claim 8, wherein determining the one or more performance metrics of the internal link includes determining the internal link is down when the network packet is not received at the host computer within a predetermined time interval after the network packet is transmitted.

12. The computer-readable storage medium of claim 8, wherein the transmitted network packet comprises a time-to-live field, and determining the one or more performance metrics of the internal link comprises determining the internal link is down when the received network packet comprises a time-to-live field having a value less than a predetermined value.

13. The computer-readable storage medium of claim 8, the method further comprising correlating the performance metrics of the internal link to performance metrics of a different internal link to determine performance metrics of a router of the interconnection network, wherein the internal link and the different internal link are associated with the router.

14. The computer-readable storage medium of claim 8, wherein the interconnection network is a high-radix network comprising multiple different tiers of routers, the first router is in a first tier of the tiers of routers, and the second router is in a different, second tier of the tiers of routers.

15. The computer-readable storage medium of claim 8, wherein the second router is configured so that traffic from an externally facing port of the interconnection network does not traverse the internal link, the externally facing port configured to communicate with a device outside of the interconnection network.

16. A system for routing network traffic, the system comprising:
   a high-radix interconnection network including a first tier of routers and a different, second tier of routers;
   a host computer connected to respective routers of the high-radix interconnection network, the host computer configured to:
      create a network packet comprising:
         a network-layer destination address corresponding to the host computer,
         the network-layer destination address within a subnet associated with a management interface of a router of the second tier of routers, and
         a data-link-layer destination address addressed to a management interface of a router of the first tier of routers, the router of the first tier of routers connected to the router of the second tier of routers by an internal link of the high-radix interconnection network;
      transmit the network packet from the host computer; and
      determine one or more performance metrics of the internal link connecting the router of the first tier of routers and the router of the second tier of routers based, at least in part, on whether the network packet is received at the host computer.

17. The system of claim 16, wherein transmitting the network packet from the host computer comprises transmitting the network packet via a first virtual local area network (VLAN) associated with the router of the first tier of routers, and wherein the network-layer destination address is associated with a second VLAN, wherein the second VLAN connects the router of the second tier of routers with the host computer.

18. The system of claim 17, further comprising a data-link-layer switch comprising a trunk port and a plurality of access ports, wherein the trunk port is connected to the host computer, a respective access port is connected to a respective router of the high-radix interconnection network, and the respective access port is associated with only the VLAN associated with the respective router.

19. The system of claim 18, wherein the host computer is connected to every router of the high-radix interconnection network, the host computer is connected to each router via a separate VLAN, and the host computer is further configured to test each individual internal link of the high-radix network.

20. The system of claim 16, wherein determining the one or more performance metrics of the internal link includes determining the internal link is down when the network packet is not received at the host computer within a predetermined time interval after the network packet is transmitted.

21. The system of claim 16, wherein the host computer is further configured to correlate the performance metrics of the internal link to performance metrics of a different internal link to determine performance metrics of a router of the high-radix network, wherein the internal link and the different internal link are associated with the router.

* * * * *